United States Patent [19]

Okumura et al.

[11] Patent Number: 4,587,452
[45] Date of Patent: May 6, 1986

[54] VIBRATION WAVE MOTOR HAVING A VIBRATOR OF NON-UNIFORM ELASTIC MODULUS

[75] Inventors: Ichiro Okumura, Tokyo; Kazuhiro Izukawa, Yokohama, both of Japan

[73] Assignee: Canon Kabushiki Kaisha, Tokyo, Japan

[21] Appl. No.: 598,972

[22] Filed: Apr. 11, 1984

[30] Foreign Application Priority Data

Apr. 30, 1983 [JP] Japan .................................. 58-76753

[51] Int. Cl.⁴ .......................................... H01L 41/08
[52] U.S. Cl. ..................................... 310/328; 310/323
[58] Field of Search ................ 310/322, 330, 26, 328, 310/324, 330, 323, 331, 332

[56] References Cited

U.S. PATENT DOCUMENTS

| 4,019,073 | 4/1977 | Vishnevsky et al. | 310/330 |
| 4,484,099 | 11/1984 | Kawai et al. | 310/328 |

FOREIGN PATENT DOCUMENTS

| 399036 | 9/1973 | U.S.S.R. | 310/328 |
| 573828 | 9/1977 | U.S.S.R. | 310/328 |
| 595813 | 3/1978 | U.S.S.R. | 310/328 |
| 623241 | 9/1978 | U.S.S.R. | 310/328 |
| 646395 | 2/1979 | U.S.S.R. | 310/328 |

Primary Examiner—Patrick R. Salce
Assistant Examiner—D. L. Rebsch
Attorney, Agent, or Firm—Fitzpatrick, Cella, Harper & Scinto

[57] ABSTRACT

In a vibration wave motor for driving a movable member contacting a vibration member by a travelling vibration wave generated in the vibration member attached to electrostrictive elements, by applying a periodic voltage to the electrostrictive elements. The vibration member is of two-plate structure having a non-uniform elastic modulus in the direction of amplitude of the travelling vibration wave.

19 Claims, 11 Drawing Figures

VIBRATION WAVE MOTOR HAVING A VIBRATOR OF NON-UNIFORM ELASTIC MODULUS

BACKGROUND OF THE INVENTION

1. Field of the Invention

The present invention relates to a vibration wave motor driven by a travelling vibration wave, and more particularly to a structure of a vibration member which propagates the vibration wave.

2. Description of the Prior Art

As shown in U.S. Pat. No. 4,019,073, a vibration wave motor transduces a vibration generated when a periodic voltage such as an A.C. voltage or a pulsating voltage is applied to electrostrictive elements, to a rotating motion or a linear motion. Since it needs no wiring, unlike a conventional electromagnetic motor, it is simple and compact in structure, produces a high torque at a low rotating speed and has a low moment of inertia.

In the vibration wave motor shown in the U.S. Pat. No. 4,019,073, a movable member such as a rotor which contacts a vibration member is frictionally driven in one direction by a standing vibration wave generated in the vibration member. In a forward movement of the vibration, the vibration member and the movable member frictionally contact each other, and in a backward movement, they separate from each other. Accordingly, the vibration member and the movable member must be structured to contact in small areas, that is, to present point or line contact to each other. As a result, friction drive efficiency is low.

Recently, in order to resolve the above problem, a vibration wave motor which friction-drives the movable member by a travelling vibration wave generated in the vibration member has been proposed.

FIG. 1 shows a major portion thereof. Numeral 1 denotes an electrostrictive element which may be PZT (titanic acid zirzonium lead) and numeral 2 denotes a vibration member which is supported on a stator (not shown) together with the electrostrictive elements 1. Movable member 3 is press-contacted to the vibration member 2 and forms a rotor. A plurality of electrostrictive elements 1 are bonded, and the electrostrictive elements in one group are arranged at a pitch which is shifted by one quarter of a wavelength λ of a vibration wave, relative to the electrostrictive element of another group. In each group, the electrostrictive elements are arranged at a pitch of one half of the wavelength λ and at opposite polarities between adjacent ones.

With the vibration wave motor of this structure, an A.C. voltage Vo sin ωT is applied to every other electrostrictive elements in one group and an A.C. voltage Vo cos ωt is applied to all electrostrictive elements in the other group. As a result, the electrostrictive elements are supplied with the A.C. voltages such that the polarities are opposite between adjacent ones and the phases are shifted by 90 degrees between the groups, and the electrostrictive elements vibrate. The vibration is propagated to the vibration member 2, which is bent in accordance with the pitch of the arrangement of the electrostrictive elements 1. The vibration member 2 projects at every other electrostrictive element position and recesses at every other electrostrictive element position. Since the electrostrictive elements in one group are arranged at one-quarter wavelength shifted positions relative to the electrostrictive elements in the other group, the bending vibration travels. While the A.C. voltages are applied, the vibrations are sequentially excited and propagated through the vibration member 2 as a travelling bending vibration wave.

The travel of the wave is shown in FIGS. 2A to 2D. Assuming that the travelling bending vibration wave travels in a direction X and O denotes a center plane of the vibration member in a stationary state, the vibration wave in a vibration state is shown by a chain line. In a neutral plane 6, bending stress is balanced. On a crossing line of the neutral plane 6 and a sectional plane 7 normal to the neutral plane 6, no stress is applied and a vertical vibration occurs. The sectional plane 7 makes a pendulum vibration laterally around the crossing line 5. In FIG. 2A, a point P on a crossing line of the sectional plane 7 and a surface of the vibration member 2 facing the movable member 1 is a right dead center of the lateral vibration and it makes only a vertical movement. In this pendulum vibration, a leftward (opposite to the direction of travel of the wave) stress is applied when the crossing line 5 is on a positive side of the wave (above the center plane O), and a rightward stress is applied when the crossing line 5 is on a negative side of the wave (below the center plane O). In FIG. 2A, a crossing line 5' and a sectional plane 7' show the former state in which a stress F' is applied to a point P', and a crossing line 5" and a sectional plane 7" show the latter status in which a stress F" is applied to a point P". As the wave travels and the crossing line 5 comes to the positive side of the wave as shown in FIG. 2B, the point P makes a leftward movement and an upward movement. In FIG. 2C, the point P is a top dead center of the vertical vibration and makes only the leftward movement. In FIG. 2D, it makes the leftward movement and a downward movement. As the wave further travels, it returns to the state of FIG. 2A through the rightward and downward movements and the rightward and upward movements. Through the series of movements, the point P makes a rotating elliptic motion, and a radius of rotation is a function of t/2 where t is a thickness of the vibration member 2. On the other hand, as shown in FIG. 2C, on a tangential line between the point P and the movable member 3, the movable member 3 is frictionally driven by the motion of the point P.

In this vibration wave motor, the velocity of the movable member 3 is determined by the velocity of the point P on the surface of the vibration member 2. In order to increase the velocity of the movable member 3, it is necessary to increase the rotating speed of the point P on the surface of the vibration member 2. The radius of the rotating vibration could be increased by increasing the thickness t of the vibration member 2, but as the thickness of the vibration member 2 increases, rigidity increases and vibration amplitude and the rotation angle of the rotating vibration are reduced. Therefore, there is a limit in the increase of the velocity of the point P on the surface of the vibration member 2.

SUMMARY OF THE INVENTION

It is an object of the present invention to provide a vibration wave motor having a high drive efficiency by imparting a non-uniform elastic modulus to a vibration member in a direction of amplitude of a travelling vibration wave.

It is another object of the present invention to provide a vibration wave motor in which the width of a vibration member in a direction Z-Z' which is normal to a plane defined by an amplitude direction Y-Y' of the vibration member and a travelling direction x of a travelling vibration wave is ununiform in the amplitude direction.

The other objects of the present invention will be apparent from the following description of the invention.

DETAILED DESCRIPTION OF THE PREFERRED EMBODIMENTS

One embodiment of the present invention is now explained with reference to FIG. 3.

Figure 1:
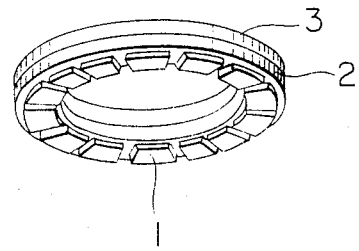
FIG. 1 shows a schematic view of a major portion of a vibration wave motor.
Figure 3A:
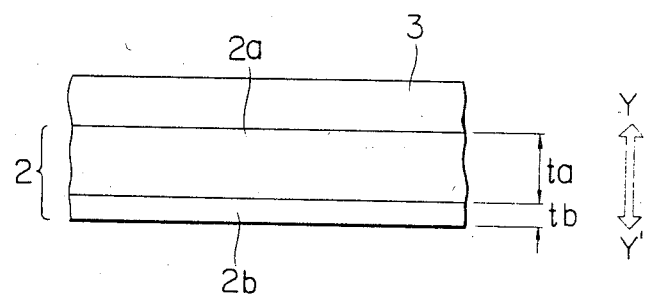
FIGS. 3A and 3B show a vibration wave motor having a vibration member of non-uniform material in accordance with one embodiment of the present invention.

In FIG. 3, numeral 2a denotes a portion of a vibration member 2 of a vibration wave motor, which is made of a material having a low Young's modulus Ea and a thickness ta, and numeral 2b denotes another portion of the vibration member 2 which is made of a material having a high Young's modulus Eb and a thickness tb. The low Young's modulus material 2a and the high Young's modulus material 2b are laminated in a direction Y·Y', and a movable member 3 contacts the low Young's modulus material 2a of the vibration member 2. The other structure is the same as that of the prior art vibration wave motor described above.

Figure 3B:
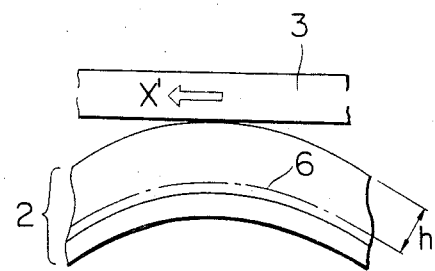
Figure 2A:
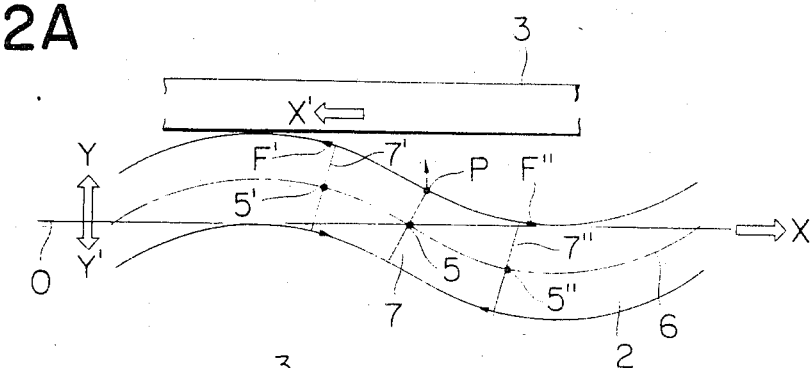
FIGS. 2A, 2B, 2C and 2D illustrate the drive principle of the vibration wave motor.
Figure 2B:
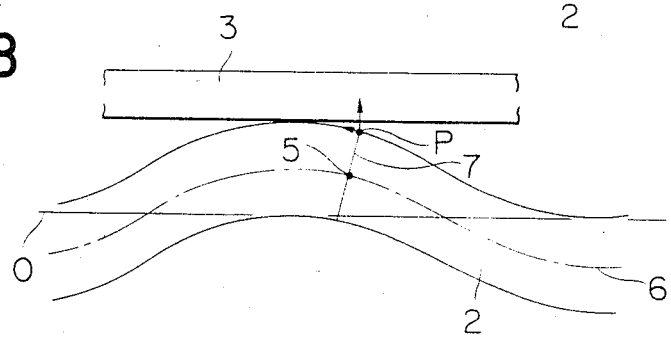
Figure 2C:
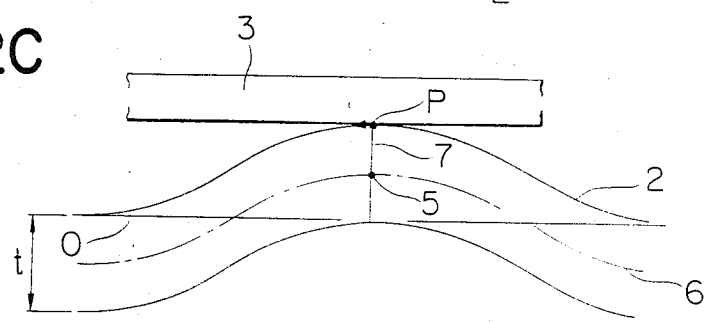
Figure 2D:
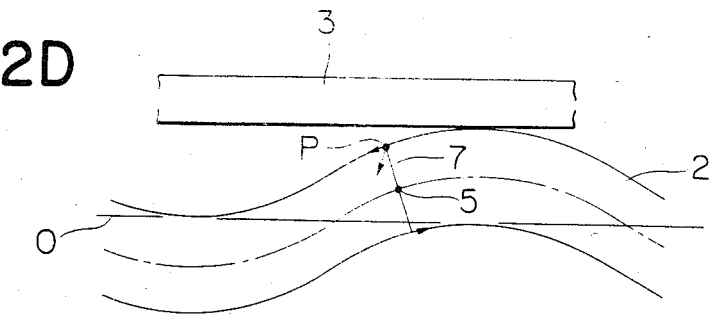

FIG. 3B illustrates the generation of a bending travelling wave in the laminated vibration member 2. Numeral 6 denotes a neutral plane in which stress is zero. The neutral plane 6 is parallel to an interface between the material 2a and the material 2b. A radius h of rotation measured from the neutral plane 6 of a rotating vibration at a point on a surface of the elastic member is given by $$h = \frac{ta^2 + \{(Eb/Ea) + 1\}tatb + (Eb/Ea)tb^2}{2ta + \{(Eb/Ea) + 1\}tb}$$

Accordingly, $$\frac{dh}{d(Eb/Ea)} = \frac{(ta + tb)^2}{\{2ta + (Eb/Ea + 1)tb\}^2} > 0$$

If $Eb/Ea = 1$, $h = (ta+tb)/2$. Thus, by selecting $Ea < Eb$, $h > (ta+tb)/2$ is met and the radius h of rotation on the surface is larger than that of a uniform elastic plate and the velocity of the movable member 3 contacting the surface is higher.

Another embodiment of the present invention is explained with reference to FIG. 4.

Figure 4A:
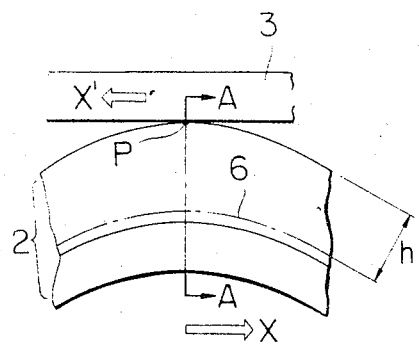
FIGS. 4A and 4B show a vibration wave motor having a vibration member of non-uniform shape in accordance with another embodiment of the present invention.
Figure 4B:
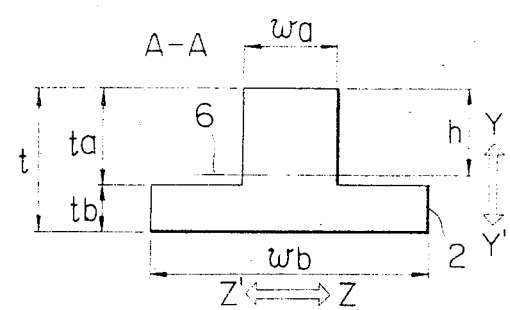

In FIG. 4, the vibration member 2 has a projecting shape. FIG. 4A illustrates the generation of a bending vibration wave in the vibration member 2 and FIG. 4B shows a sectional view taken along a line A—A. The other structure is the same as that of the vibration wave motor described above.

In FIG. 4, the width of the vibration member 2 in a direction Z·Z' is narrow on the surface facing the movable member 3 and wide on the opposite surface. Since the neutral plane 6 of the wave is offset downward from a center of the thickness of the vibration member 2, that is, further from the movable member 3, the radius h of rotation at the point P is larger than that when the width of the vibration member 2 is uniform. The radius h of rotation is given by $$h = \frac{wa(ta)^2 + 2wbtatb + wb(tb)^2}{2(wata + wbtb)}$$

$$= \frac{ta^2 + 2(wb/wa)tatb + (wb/wa)tb^2}{2\{ta + (wb/wa)tb\}}$$

where wa and ta are the width and thickness of the narrow area, and wb and tb are the width and thickness of the wide area.

Accordingly, $$\frac{dh}{d(wb/wa)} = \frac{tatb(ta + tb)}{2\{ta + (wb/wa)tb\}^2} > 0$$

If $wb/wa = 1$, $h = (ta+tb)/2$. Since $wa < wb$ in the present embodiment, $h > (ta+tb)/2$ and hence the radius of rotating vibration on the surface is larger than that in a uniform elastic plate.

Figure 5A:
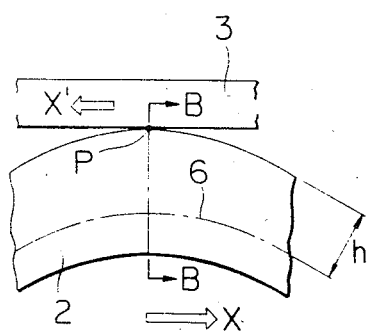
FIGS. 5A and 5B show a modification of FIG. 4.
Figure 5B:
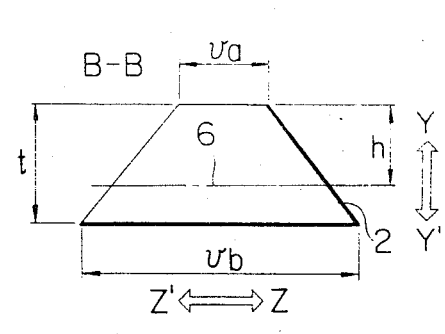

FIG. 5 shows a modification of FIG. 4. In FIG. 5, the vibration member 2 has a pedestal shape. FIG. 5A shows the generation of a bending vibration wave in the vibration member 2 and FIG. 5B shows a sectional view taken along a line B—B.

In FIG. 5, the width of the vibration member 2 in the direction Z·Z' continuously increases starting from the surface facing the vibration member 3. The radius h of rotation is given by $$h = \frac{t}{3} \cdot \frac{2vb + va}{vb + va} = \frac{t}{3} \cdot \frac{2vb/va + 1}{vb/va + 1}$$

where va is a width in the narrow area and vb is a width in the wide area.

Accordingly, $$\frac{dh}{d(vb/va)} = \frac{t}{3} \cdot \frac{1}{(vb/va + 1)^2} > 0$$

If $vb > va = 1$, $h = t/2$. Since $va < vb$ in the present embodiment, $h > t/2$.

As described hereinabove, since the radius h of rotation is larger than that of a uniform vibration member, the velocity of the vibration member is higher and drive efficiency of the vibration wave motor is higher.

In the embodiment of FIG. 3, the width of the material 2a of the vibration member 2 facing the movable member 3 may be narrow and the material 2b on the opposite surface may be wide to form a non-uniform shape. It provides a combined effect.

The present invention may also be applicable to a linear vibration wave motor.

What we claim is:

1. A vibration wave motor comprising: electrostrictive elements;

a vibration member for generating a travelling vibration wave when voltages having a phase difference therebetween are applied to said electrostrictive elements, said vibration member having a non-uniform elastic modulus in a direction of amplitude of the travelling vibration wave; and a movable member frictionally driven by the travelling vibration wave generated in said vibration member.

2. A vibration wave motor according to claim 1, wherein said vibration member is a two-plate structure having different elastic moduli with the plate facing said electrostrictive elements having a higher elastic modulus and the plate facing said movable member having a lower elastic modulus.

3. A vibration wave motor comprising:
electrostrictive elements;
a vibration member for generating a travelling vibration wave when voltages having a phase difference therebetween are applied to said electrostrictive elements, said vibration member having a non-uniform width in a direction normal to a plane defined by an amplitude direction and a travelling direction of the travelling vibration wave, with respect to the amplitude direction; and a movable member frictionally driven by the travelling vibration wave generated in said vibration member.

4. A vibration wave motor according to claim 3, wherein said vibration member has a shape which, in section, has a width, on a surface facing said movable member, which is smaller than the width on a surface facing said electrostrictive elements.

5. A vibration wave motor according to claim 3, wherein said vibration member has a non-uniform elastic modulus in the amplitude direction of the travelling vibration wave.

6. A vibration wave motor comprising:
(a) a vibration member including electrostrictive elements for generating a travelling vibration wave by driving said electrostrictive elements, said vibration member having a tapered edge section in a plane perpendicular to the movement direction of said travelling vibration wave;
(b) a movable member which is driven by the travelling vibration wave of said vibration member.

7. A vibration wave motor comprising:
(a) a vibration member including electrostrictive elements for generating a travelling vibration wave by driving said electrostrictive elements, said vibration member having an inverted T shape section when viewed in a plane perpendicular to the movement direction of said travelling vibration wave;
(b) a movable member which is driven by the travelling vibration wave of said vibration member.

8. A vibration wave motor comprising:
(a) a vibration member including electrostrictive elements which when driven cause deformation of said member to generate a travelling vibration wave, said vibration member having a tapered edge section; and
(b) a movable member which is driven by the travelling vibration wave of said vibration member.

9. A vibration wave motor comprising:
(a) a vibration member including electrostrictive elements which when driven cause deformation of said member to generate a travelling vibration wave, said vibration member having an inverted T shape section; and
(b) a movable member which is driven by the travelling vibration wave of said vibration member.

10. A motor comprising:
(a) a vibration member having electro-mechanical energy conversion elements for generating a travelling wave therein, said vibration member having a neutral plane in which the stress is zero during vibration, which plane is substantially deviated away from the center of said vibration member in the amplitude direction of the travelling wave; and
(b) a contact member for receiving the force of the travelling wave from said vibration member.

11. A motor according to claim 10, wherein the neutral plane of said vibration member is deviated from the center of said vibration member due to the non-uniform elastic modulus of said vibration member.

12. A motor according to claim 10, wherein the neutral plane of said vibration member is deviated from the center of said vibration member due to the non-uniform width of said vibration member in the amplitude direction of the travelling wave.

13. A motor according to claim 10, wherein said contact member is movable.

14. A motor according to claim 10, wherein said vibration member comprises a member which is fixed to said conversion element.

15. A motor according to claim 11, wherein said conversion elements comprise:
(a) first electro-mechanical conversion elements; and
(b) second electro-conversion elements spatially phase differentially arranged with respect to said first elements.

16. A motor according to claim 10, wherein the neutral plane of said vibration member is deviated from the center of said vibration member due to the non-uniform condition of a part of said vibration member other than said energy conversion elements.

17. A motor according to claim 12, wherein said vibration member, in section, has a width, on a surface facing said contact member, which is smaller than the width on a surface facing said electro-mechanical conversion elements.

18. A motor according to any one of claims 10–17, wherein said electro-mechanical conversion elements are electrostrictive elements.

19. A motor according to claim 10, wherein said neutral plane is offset from said contact member.

* * * * *